United States Patent [19]

Burrow et al.

[11] 4,065,935
[45] Jan. 3, 1978

[54] ARTICULATED JOINTS FOR DEEP WATER INSTALLATIONS

[75] Inventors: Reginald Edward Dowton Burrow, Hatch End; David Edmund Plaskitt, High Wycombe, both of England

[73] Assignee: Taylor Woodrow Construction Limited, England

[21] Appl. No.: 705,933

[22] Filed: July 16, 1976

[30] Foreign Application Priority Data

July 18, 1975 United Kingdom ............... 30310/75

[51] Int. Cl.² ............................................. E02D 21/00
[52] U.S. Cl. .......................................... 61/95; 52/230
[58] Field of Search ................... 61/95, 101, 87, 69 K, 61/94; 175/7, 8; 166/.5, .6; 9/8 R; 52/230

[56]           References Cited
           U.S. PATENT DOCUMENTS

| 3,563,042 | 2/1971 | Ryan | 61/95 |
| 3,710,580 | 1/1973 | Mott | 61/95 |
| 3,756,293 | 9/1973 | Adler et al. | 61/95 X |
| 3,875,998 | 4/1975 | Charpentier | 175/8 |

*Primary Examiner*—Jacob Shapiro
*Attorney, Agent, or Firm*—Armstrong, Nikaido & Marmelstein

[57] ABSTRACT

An articulated joint for a deep water installation in which two structural members are connected by replaceable flexible tendons to which there is access from one of the structural members to permit a pressure bottle to be fitted for receiving for replacement any selected one of the tendons after release of this tendon from the other structural member.

13 Claims, 23 Drawing Figures

ARTICULATED JOINTS FOR DEEP WATER INSTALLATIONS

This invention relates to articulated joints for use in connecting structures in installations for the extraction of oil and gas from deep water sites such as the edges of continental shelves and slopes, and is particularly concerned with such a joint in which two structural members are connected by replaceable flexible tendons.

The invention provides an articulated joint for a deep water installation in which two structural members are connected so as to afford limited pivotal movement between the members, the joint comprising replaceable flexible tendons connecting the structural members with a clearance between the members, there being access from the interior of at least one of the structural members to that end of each of said tendons that is connected to this structural member and each said tendon being releasably held fast at this end in fluid-tight manner with respect to this structural member at a mounting station adapted to have fitted at it a pressure bottle for containing the tendon whilst maintaining the fluid-tight sealing relationship of the tendon with the structural member, whereby removal of the tendon from the joint can be effected, with the pressure bottle fitted and the tendon released at its other end from the other structural member, by pressurizing the bottle, releasing said one end of the tendon, and de-pressurizing the bottle to permit the tendon to enter the bottle; there being a tendon extension at the other end of the tendon which is arranged to enter into fluid-tight sealing relationship with the last-mentioned structural member, when entry of the tendon into the pressure bottle is completed, thereby permitting removal of the tendon and the bottle from the tendon extension and fitting of a replacement tendon to the tendon extension.

For a better understanding of the invention and to show how the same may be carried into effect, reference will now be made, by way of example, to the accompanying drawings, in which:

FIGS. 22 and 23 are sectional end views respectively taken on the lines M—M and N—N of FIGS. 20 and 21.

Figure 1:
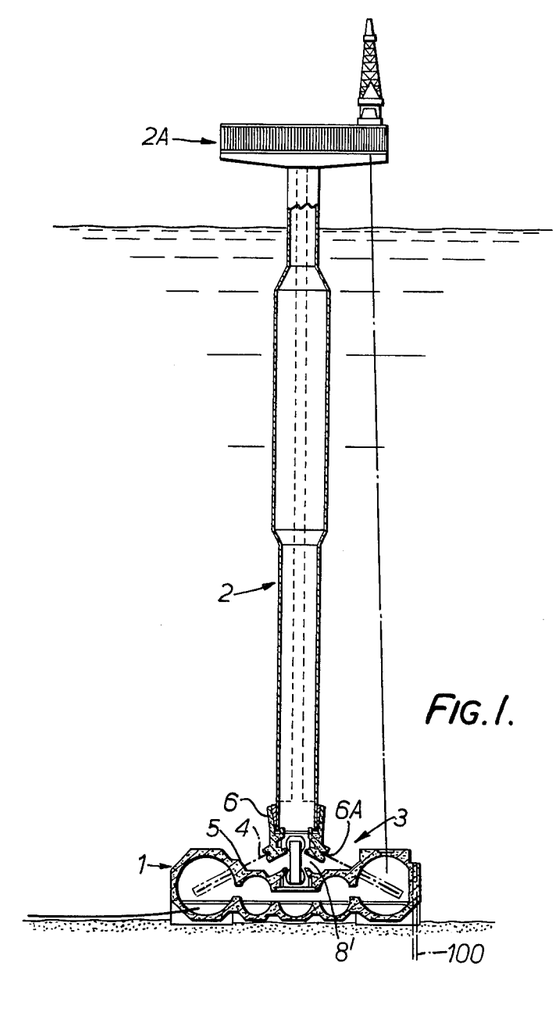
FIG. 1 illustrates in diagrammatic sectional side view an assembly consisting of a foundation member shown placed on the sea bed and an upright column pivotably connected by a joint to the foundation member and supporting above the surface of the sea a deck superstructure.

The foundation member 1 is in the form of a housing for housing so-called "subsea completions", the member 1 being a prestressed concrete member which is constructed to have adequate buoyancy and stability for towing from its place of construction to its intended offshore location, where it is submerged to the sea bed. The member 1 then either rests on the sea bed under the effect of gravity, or (and as illustrated) is held by piles 100 driven through passageways provided in the housing 1 and into the sea bed. Preferably piling is effected by driving groups of piles by hydraulic drive equipment generally of the type forming the subject of Taylor Woodrow Construction Limited's U.S. Pat. No. 3,279,195 in which in driving a group of piles load is taken from driven piles of the group to a pile or piles being driven. In FIG. 1 the upright column is referenced 2, the joint between the member 1 and the column 2 is referenced 3, and the deck superstructure is referenced 2A.

Figure 2:
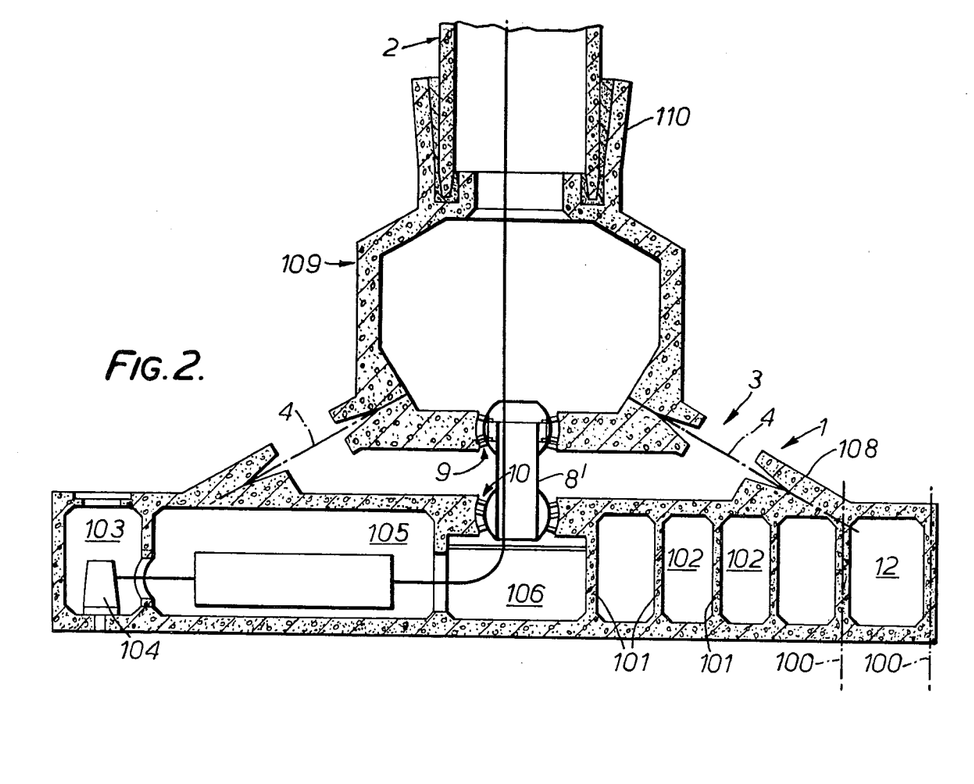
FIG. 2 is a diagrammatic sectional view of the lower part of a further form of an assembly such as shown in FIG. 1, drawn to a larger scale than FIG. 1, and taken on the line B—B of FIG. 2.
Figure 3:
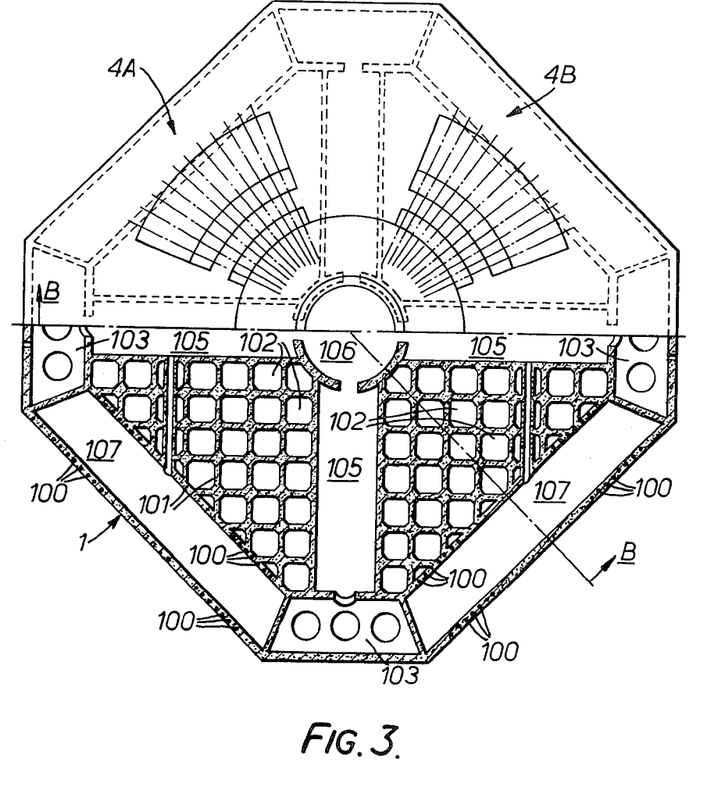
FIG. 3 is a partly sectioned plan view of the part shown in FIG. 2.

Referring to FIGS. 2 and 3, in which a form of the member 1 is shown in greater detail than in FIG. 1, the member 1 has defined within it by walls 101 chambers for various purposes. The chambers include chambers 102 for providing buoyancy and stability during floatation and that are flooded for submerging; chambers 103 for housing well heads 104 of subsea completions; chambers 105 for housing plant and providing passageways for oil/gas flow ducts from the subsea completions; a central chamber 106 from which the chambers 105 radiate; and chambers 107 constituting galleries giving access to anchorages of the tendons 4 of the joint 3.

Figure 4:
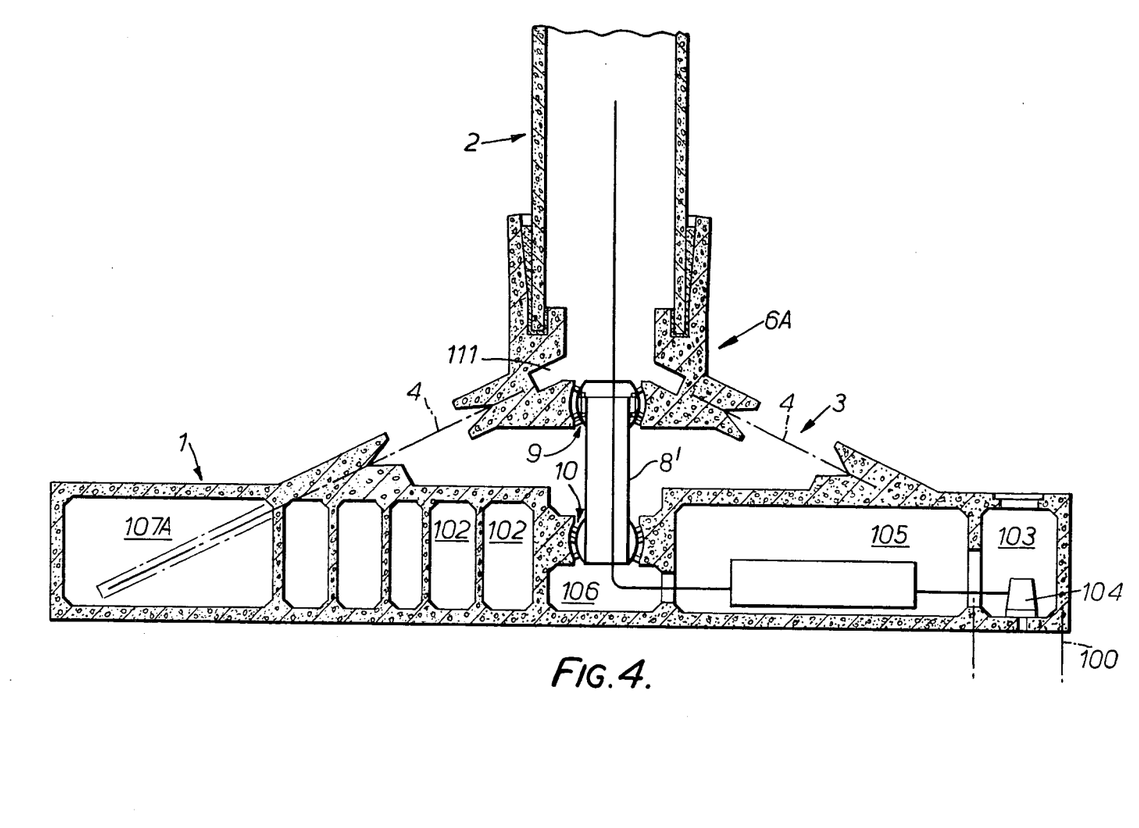
FIG. 4 is a view similar to FIG. 2 but of a further modified form.
Figure 5:
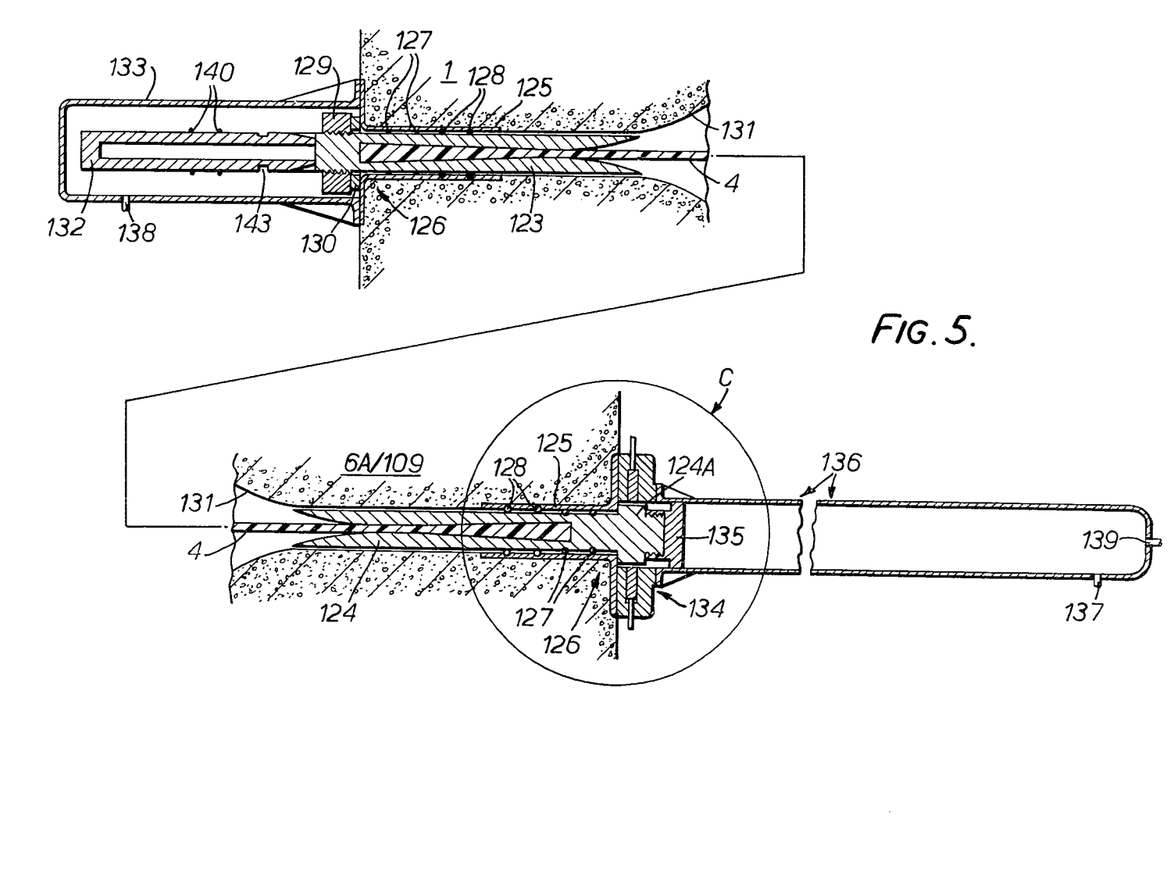
FIG. 5 is a sectional view showing a tendon and its anchorages of a joint such as provided in the assemblies of FIGS. 1 to 4.

The joint 3 includes tendons 4 which extend in four radially spaced-apart groups (two of which are shown at 4A and 4B in FIG. 5) from individual lower anchorages in a circular rib 108 on the upper surface of the member 1, upwardly and inwardly to individual upper anchorages around a circular base of a concrete vessel 109 (which, in the form of FIGS. 4 and 5, replaces a socket member 6 illustrated in FIG. 1 and in which the column 2 is supported. This arrangement of tendons permits limited rotation of the column 2 about its axis relative to the housing 1 of up to 10° or 15°, and swinging movement, and also slight translational and vertical movement of the column relative to the housing, these various degrees of freedom permitting the joint between the column and the housing to accommodate movement as a result of water motion. The adoption of four groups of tendons gives a tendon geometry such that no tendon is in line with a subsea completions chamber 103, thus facilitating access to the lower tendon anchorages from the galleries 107. The tendons are preferably of a high strain capability synthetic plastics material.

The interior of the vessel 109 is connected to the central chamber 111 of the member 1 by a shaft 8' that is disposed centrally of the tendons 4 and that passes through seal assemblies 9 and 10 between the shaft and the vessel 109, and between the shaft and the member 1, respectively.

The top of the vessel 109 is formed as a socket 110 into which is entered the bottom end of the column 2, which is also a prestressed concrete. If desired there can be provision for oil storage within the column 2.

In the form of FIGS. 2 and 3 the vessel 109 is of sufficient size to permit drawing of the tendons 4 of the joint 3 into the interior of the 109, whereby tendons can be replaced when desired. The form of FIG. 1 is, in general, the same as that just described, except that in the FIG. 1 form tendon replacement is carried out by drawing the tendons into the member 1, which has tendon replacement chambers 107A instead of the galleries 107 of the form of FIGS. 2 and 3. Access is gained to the tendon replacement chambers 107A via suitable passageways.

FIG. 4 shows a modification of the form of FIG. 1, in which, in addition to the tendon replacement chambers 107A in the housing 1, an access gallery 111 to the upper tendon anchorages is provided in a socket member 6A replacing the socket member 6.

Various arrangements can be utilized for effecting tendon replacement, and these will now be described with reference to FIGS. 5 to 23. For ease of description it will be assumed that a tendon that is placed and tensioned to its operating load has to be replaced.

The arrangement of FIGS. 5 to 8, which will be described first, is suitable where access to the anchorages at each end of the tendon 4 is available (as illustrated in FIGS. 2 to 4). The tendon 4 is a high strain capability synthetic plastics material, flared and bonded at each end into a cylindrical steel member 123 or 124 that is entered, at a mounting station, in a tubular portion 125 of a tendon anchorage that terminates in a bulkhead 126. Each steel member 123, 124 carries seals 127 co-operating with the anchorage tubular portion 125, and there are provided in the tubular portion 125 further inflatable seals 128 that are normally deflated, but that can be inflated in the event of failure of the seals 127. The outer end of the steel member 123 at what is the lower end of the tendon in FIGS. 2 to 4 is threaded and secured by a large nut 129 bearing via chocks (or shims) 130 on the adjacent anchorage bulkhead 126; the other steel member 124 having a shoulder 124A that bears (without the intervention of chocks) on its adjacent bulkhead 126. There can thus be maintained a desired load in the tendon. The shoulder 124A and the nut 129 are capped by sealing domes (not shown) bolted to the bulkheads 126 and able to resist full sea pressure in the event of failure of the seals 127, equipment (not shown) being provided for detecting leakage into these domes.

The tubular anchorage portions 12 terminate externally in fairleads 131 formed in the member 1 and the socket member 6.

Prior to effecting tendon replacement, the sealing domes are removed and at the lower end of the tendon a cylindrical tendon extension 132 is bolted to the outer end of the steel member 123. A sealing cap 133 sufficiently large to accommodate the tendon extension 132 is provided that can be fitted at the mounting station at the end of the tendon by being bolted to the bulkhead 126 in place of the removed sealing dome.

At the mounting station at the upper end a shear key housing 134 is fitted over the shoulder 124A and secured to the adjacent bulkhead 126, a piston head 135 is fitted to the outer end of the member 124, and a pressure bottle 136 is fitted to the shear key housing 134, taking the place of the removed sealing dome. The condition now reached (including fitting of the extension 132 and cap 133 although in fact this is done later — see below) is that illustrated in FIG. 5 and in the upper half of FIG. 6.

By connecting pressurization equipment to an inlet 137 of the bottle 136 the bottle 136 is pressurized to the external hydrostatic pressure, the inflatable seals 128 if these have been inflated being deflated as necessary to reduce frictional resistance to tendon movements.

With the bottle 136 pressurized, and before placing the extension 132 and cap 133 in position, the nut 129 is detensioned utilizing a prestressing jack, the chocks 130 released, and the nut removed along with the chocks. During and after these operations sea pressure maintains some pressure in the tendon and holds the member 123 in the tubular portion 125 whilst the extension 132 and the cap 133 are fitted.

Figure 6:
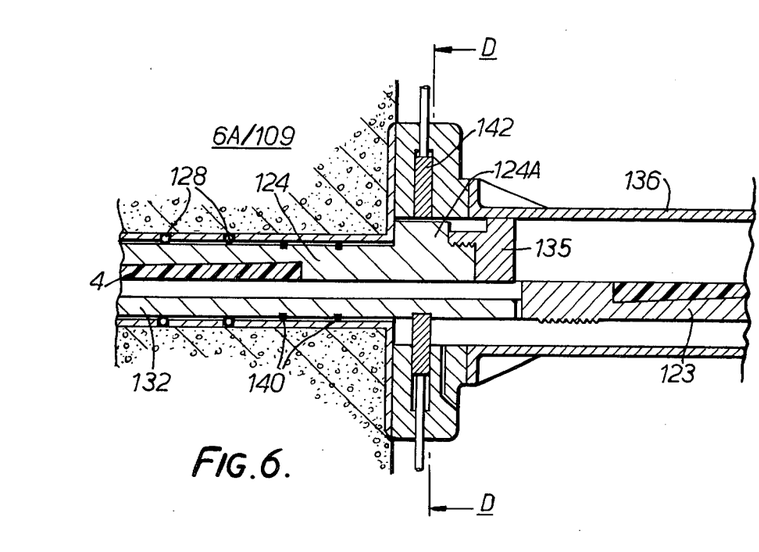
FIG. 6 is a sectional view of the detail encircled at C in FIG. 5, drawn to a larger scale and illustrating two operating conditions.
Figure 7:
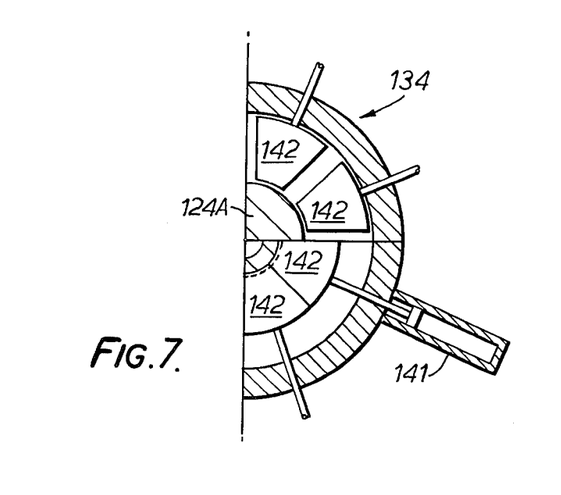
FIG. 7 is a half cross-sectional view taken on the line D—D of FIG. 6.
Figure 8:
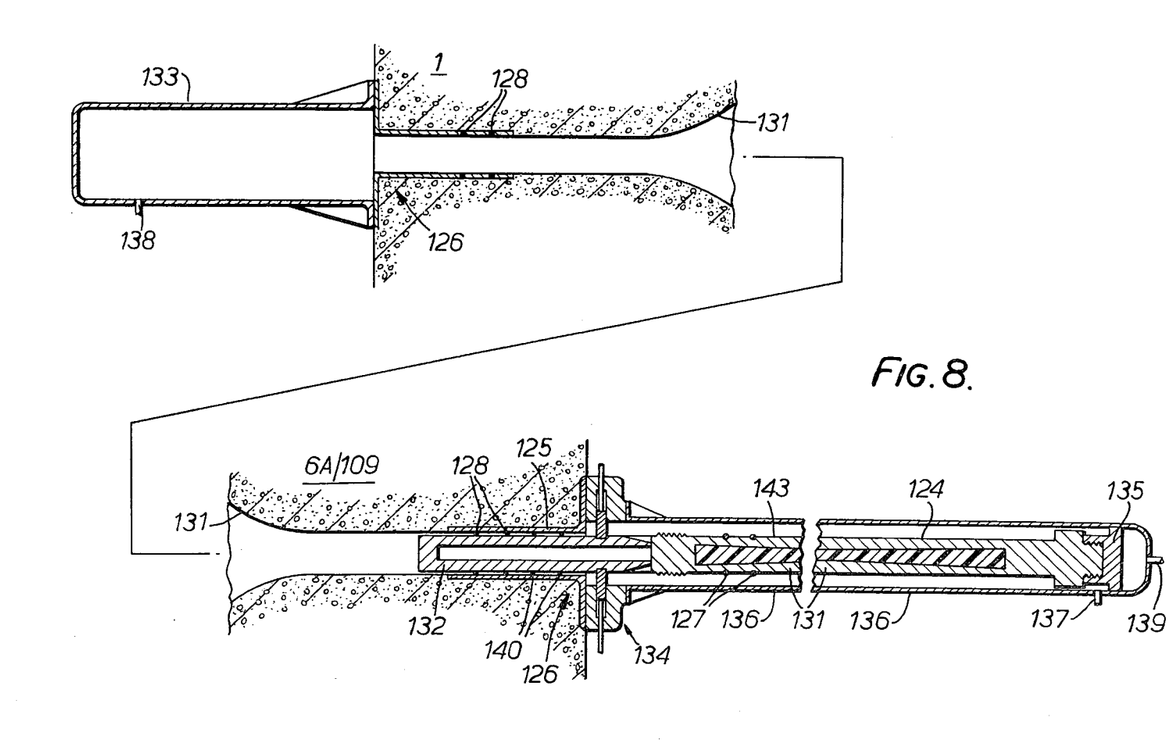
FIG. 8 is a view similar to FIG. 5 but illustrating a different operating condition.

Utilizing an inlet 138 the cap 133 is pressurized to equalize pressure throughout the system and place the unit 4/123/124/132/135 in hydrostatic equilibrium, whereby by reducing the pressure in the bottle 136 utilizing an outlet 139, which is the next operation, this unit as a whole is drawn in the direction out of the cap 133 and into the bottle 136 so that the condition illustrated in FIG. 8 and in the lower half of FIG. 6 is reached. It is to be noted that at the end of this movement the tendon extension 132 replaces the member 124 in the upper tendon anchorage tubular portion 125, seals 140 carried by the extension 132 sealing on the tubular portion 125, so that the extension 132 replaces the member 124 in sealing the tubular portion 125. As a precaution the inflatable seals 128 that are now able to co-operate with the extension 132 are inflated and a double acting ram arrangement 141 (FIG. 7 is operated to extend (lower half of Figure previously retracted (upper half of FIG. 7) shear keys 142 so that they engage in an annular notch 143 (FIG. 6) in the extension 132. The extension 132 is thus locked in position, sealing the tubular portion 125.

The bottle 136 is entirely de-pressurised and, utilizing previously closed hatches (not shown) in the bottle 136 to gain access, the member 123 is detached from the locked extension 132. The bottle 136 is then un-bolted from the shear key housing 134 and removed, containing the tendon 4 with the members 123 and 124 and piston head 135, which can then be taken out of the bottle.

To fit a new tendon, the piston head 135 is fitted to the member 124 of the new tendon and this tendon complete with the piston head is inserted in the bottle 136. The bottle 136 is bolted to the shear key housing 134 and the member 123 of the new tendon is bolted to the extension 132 which has remained locked in position.

The bottle 136 is pressurized, the inflated seals 128 are deflated, the shear keys 142 are retracted, and the pressure in the bottle 136 is increased sufficiently above sea pressure to overcome the resistance of seal friction etc., and move the unit 4/123/124/132/135 in the direction out of the bottle 136 and into the cap 133. The cap 133 is depressurized and detached from it bulkhead 126, the extension 132 is removed, the tendon is tensioned and the nut 129 and chocks are fitted, the bottle 136, piston head 135 and shear key housing 134 are removed, and the sealing domes are fitted. The extension 132, the cap 133, the shear key housing 134, the piston head 135 and the bottle 136 are then all available for use in replacing another tendon of the joint.

The seals 127 and 140 can be replaced at each tendon replacement operation, and can be of any convenient form.

It is to be noted that as the tendon being replaced is drawn out of the lower anchorage and fairlead its end comes free. A light articulating slide (not shown) may be provided to bridge the gap between the lower and upper anchorages and provide a guide during installation of the replacement tendon. As an alternative, the tendon could be provided, throughout its length, with a washer system offering several desirable facilities, including:

i. protection to the cable;
ii. means of centralizing the tendon whilst at the same time allowing it to flex and bear in a controlled way against the surfaces of the fairleads; and
iii. a member against which the tendon can be prestressed during initial assembly so that it has sufficient rigidity at all times when it is not under working load, this rigidity enabling the tendon to be inserted into or withdrawn from the lower fairlead without the need for a separate guide structure.

Figure 9:
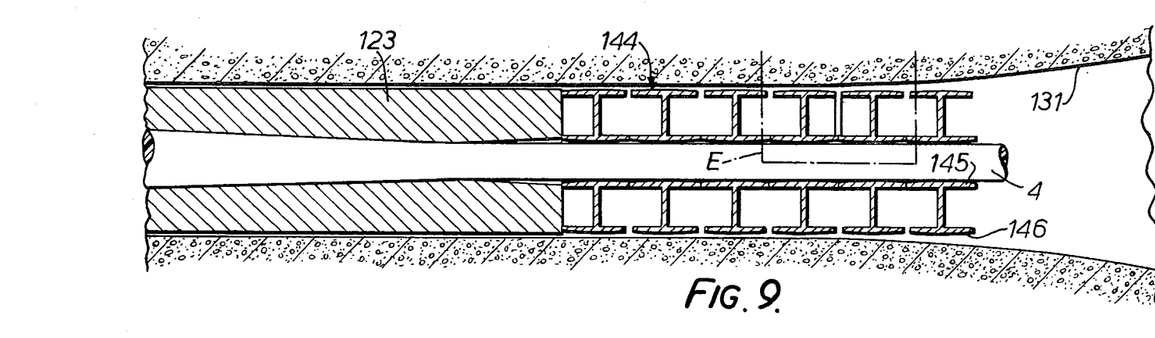
FIG. 9 is a sectional view showing protective members that can be provided for the tendon of FIGS. 5 to 8.
Figure 10:
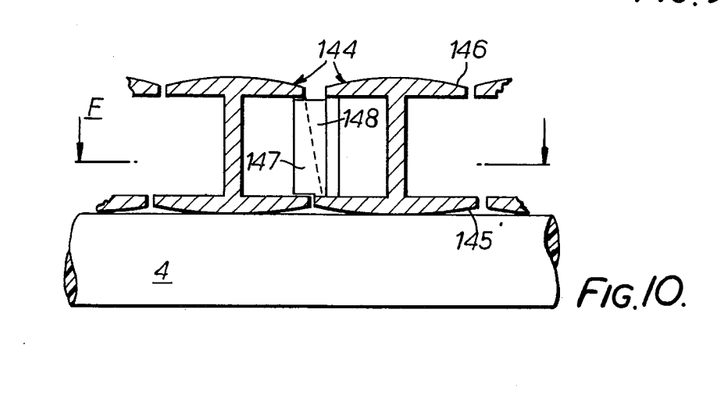
FIG. 10 is a side view of a detail of the protective members of FIG. 9 taken at E of FIG. 9 and drawn to a larger scale.
Figure 11:
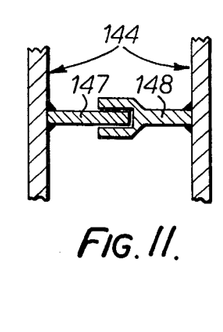
FIG. 11 is a section taken on the line F—F of FIG. 10.

Such a washer system is illustrated in FIGS. 9, 10 and 11, in which the individual washers of the system are referenced 144. Each is of I-section as viewed on a radial plane and offers both to the tendon 4 and the fairlead 131 a convex surface 145 or 146. The washers 144 are placed in substantially abutting relationship along the tendon 4, and if torsional resistance is required neighbouring washers are provided with inter-engaging male and female shear plates 147 and 148.

The arrangement of FIGS. 12 to 19, which will now be described, is suitable where access for tendon removal is only possible to the anchorage at one end of the tendon and no access at all is available at the other end, the particular arrangement illustrated being one in which the access is to the upper end of the tendon as in FIG. 2. Where components as already described are utilized the reference numerals already used are used also in FIGS. 12 to 19 and the components will not be described again.

The principal differences in the form of FIGS. 12 to 19 are that the tendon 4A has a central bore 150 through which a flexible drive shaft can be passed; provision is made for prestressing and chocking at the upper end utilizing a large nut 151 threaded onto the member 124A and bearing via chocks 152 on the bulkhead 126; the outer end of the member 124A and the piston head 135A that can be attached thereto are bored out for receiving a drive unit for the flexible drive shaft; at the lower end there is cast into the member 1 a threaded anchor block 153; and the member 123A at this end of the tendon carries a threaded anchor head 154 for engagement with the anchor block 153 and to which the extension 132 is bolted.

Tendon replacement is carried out as follows.

Figure 12:
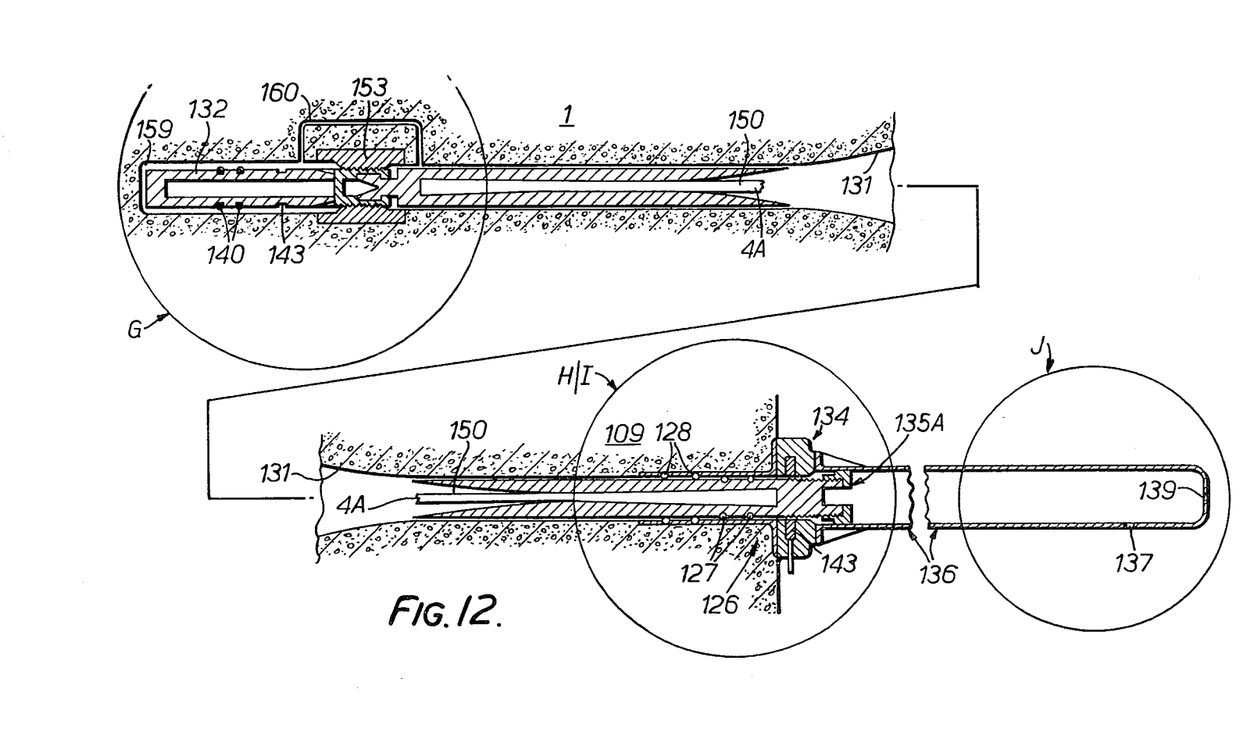
FIG. 12 is a view similar to FIG. 5 of an alternative form.
Figure 13:
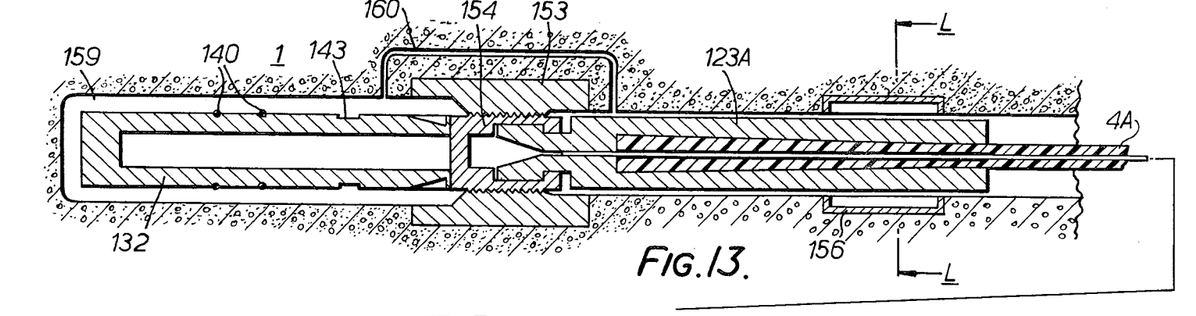
FIGS. 13 to 16 are sectional views of the details respectively encircled at G, H/I, and J in FIG. 12, drawn to a larger scale and illustrating different operative conditions.
Figure 14:
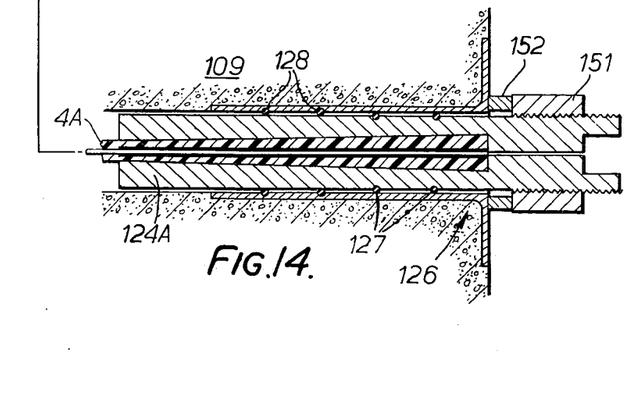
Figure 15:
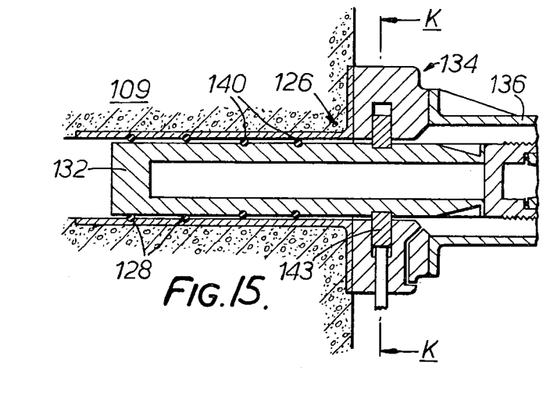
Figure 16:
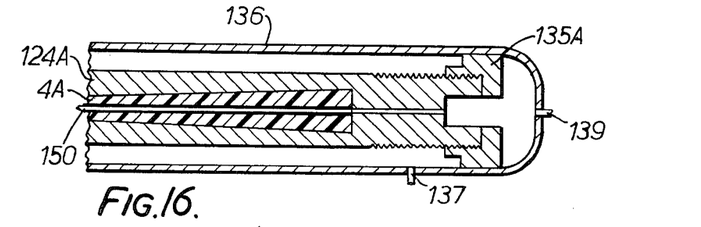
Figure 17:
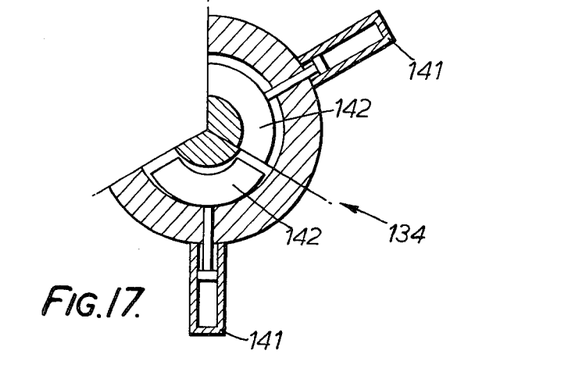
FIG. 17 is a sectional view on the line K—K of FIG. 15.
Figure 18:
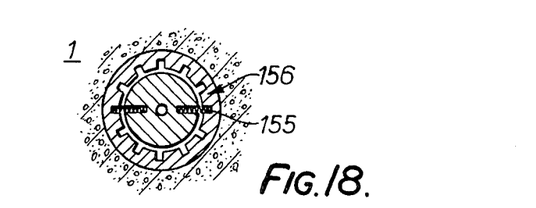
FIG. 18 is a sectional view on the line L—L of FIG. 13.
Figure 19:
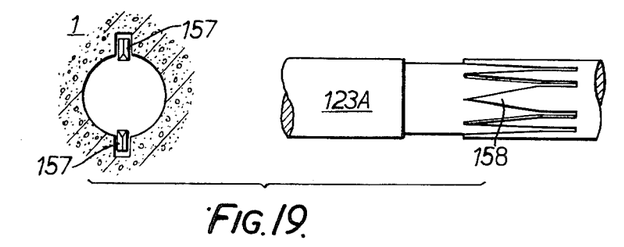
FIG. 19 shows in end and side view a detail of a modification of the alternative form of FIGS. 12 to 18, FIGS. 20 and 21 are sectional side views of two further alternative forms.

Working from the upper end, the tendon 4A is detensioned and the chocks 152 and anchor nut 151 removed. The shear key housing 134 is positioned and secured to the bulkhead 126. The piston head 135A is secured to the member 124A, the flexible drive shaft is passed down the bore 150 to engage the anchor head 154 and the drive unit for this flexible drive shaft is mounted at the piston head end of the member 124A. The bottle 136 is then pressurized and the drive unit operated to unthread the anchor head 154 from the anchor block 153. Once the anchor head is free of the anchor block the bottle 136 is depressurized so that the unit 4A/123A/124A/132/135A is drawn in a direction to enter the bottle 136 as already described, whereafter operations as already described are carried out to enable the bottle 136 containing the tendon 4A with the members 123A and 124A, the piston head 135A, the flexible drive shaft and its drive unit, and the anchor head 154 to be removed.

A new tendon is fitted substantially in the manner already described but, of course, utilizing, in reverse, those operations which are specific to the arrangement of FIGS. 12 to 19 and which have just been described.

For locking the lower end of the tendon 4A against rotation whilst the anchor head 154 is being unscrewed or screwed in, the member 123A is provided with spring-loaded splines 155 (FIG. 18) that engage in a spline case 156 cast into the member 1. As an alternative, illustrated in FIG. 19, spring loaded lugs 157 can be provided in the member 1 for engagement with tapered splines 158 provided on the member 123A.

Coupling or uncoupling of the anchor head 154 can be achieved in various other alternative ways, for example, by passing hydraulic fluid through the bore in the tendon 4A under pressure to operate a hydraulic motor arranged to rotate the anchor head with respect to the tendon. As a further alternative, an actuator could be provided at the upper end for rotating the entire tendon assembly to unscrew it from the member 1. In this case the locking mechanisms of FIGS. 18 and 19 would not be used, and in order to transmit the torque from the upper end to the housing it would be necessary to incorporate the inter-engaging male and female shear plates 147 and 148 on the washers 144.

It is to be noted that in this form at the lower end, the tendon extension 132 remains in position throughout the use of the tendon in the joint, the extension 132 being disposed in a chamber 159 in the member 1. This chamber 159 is substantially sealed but is connected via a bleed duct 160 to the fairlead 131 to permit equalization of pressure.

FIGS. 20 to 23 illustrate alternative arrangements that can be provided, in the form of FIGS. 12 to 19 at the end of the tendon to which direct access cannot be gained.

Figure 20:
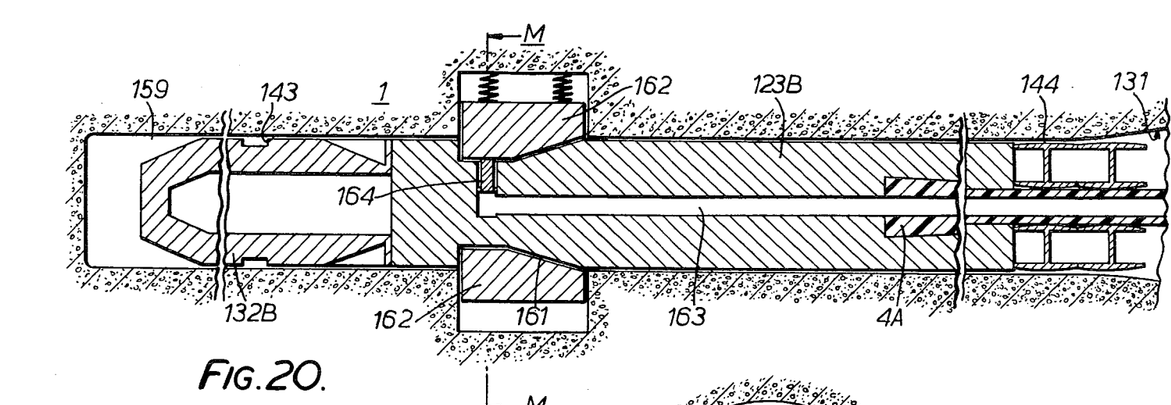
Figure 22:
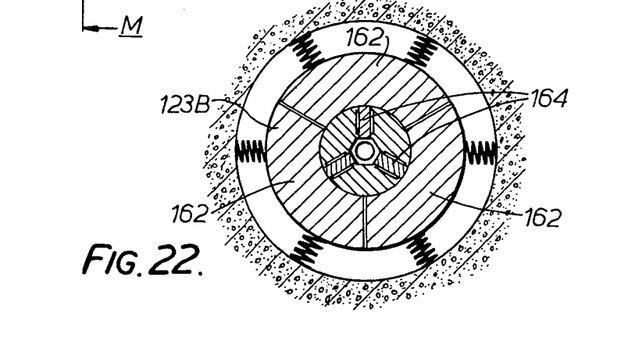

Referring first to FIGS. 20 and 22, the member 123B is fitted with a circumferential key way 161 into which can engage a series of spring-loaded keys 162 mounted in the member 1. When a tendon is being fitted, these keys 162 are initially pushed out of the way, the extension 132B provided in this form having a tapered end to facilitate this operation. Eventually the spring-loading of the keys is able to assert itself so that the keys 162 enter the key ways 161 to lock the tendon against withdrawal.

When it is desired to effect withdrawal, oil is fed under pressure down the bore in the tendon 4A and through a bore 163 in the member 123B to extend, radially of the member 123B, a number of rams 164 which thereby act on the keys 162 to urge the keys out of the key way 161.

It is to be noted that the annular notch 143 in the extension 132B has to be dimensioned such that the keys 162 will not enter it. As a precautionary measure, radially-acting rams similar to the rams 164 can be provided in association with the notch 143.

Figures 21, 23:
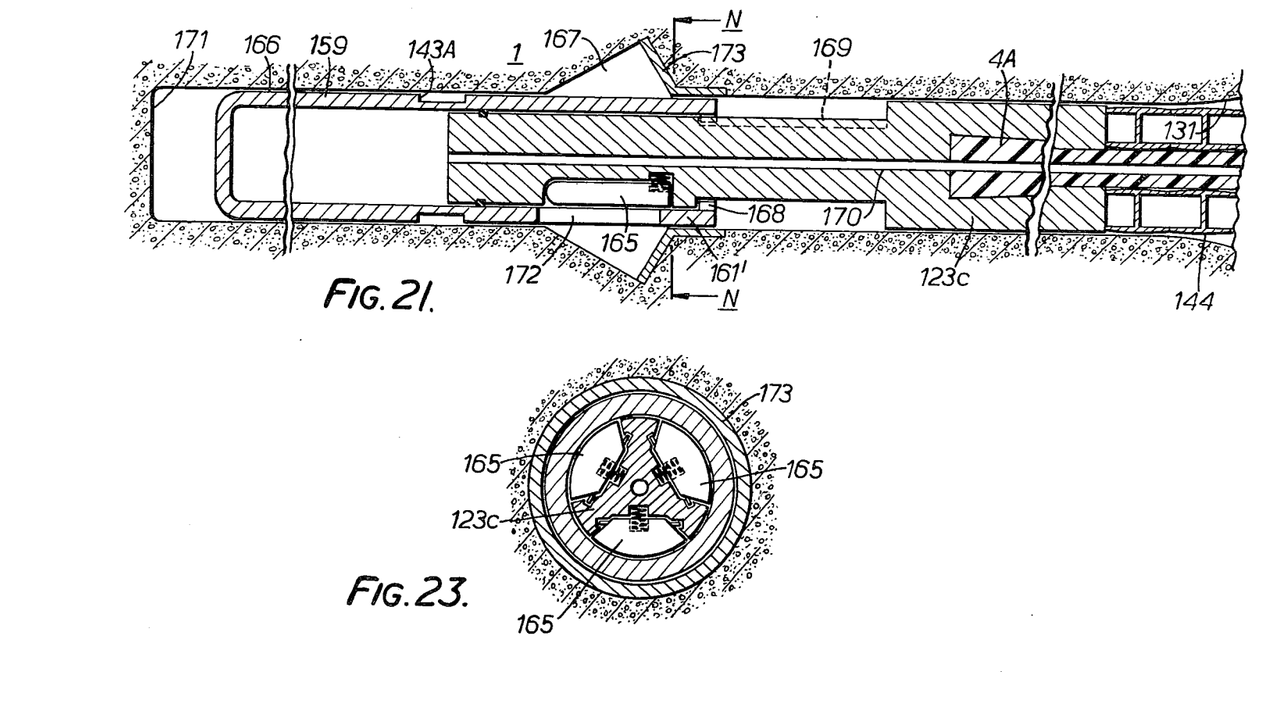

In the form of FIGS. 21 and 23 the member 123C is provided with a number of spring loaded arms 165 which are held against their spring-loading by the extension (132) which is formed in this case as a cap 66. In the member 1 there is provided an annular key way 167 for receiving the arms 165.

At the commencement of a tendon replacement operation, the cap 166 is fitted to the member 123C so that it is positioned as shown in FIG. 21 with the skirt 166' of the cap 166 bearing on the arms 165 to hold them in their retracted positions. Retaining lugs 168 at the skirt end of the cap 166 are disposed in slide ways 169 in the member 123C to retain the cap on the member 123C. Tendon replacement is then commenced substantially in the manner already described with the cap 166 being maintained in its extended position illustrated in FIG. 21 by pressure passed down the bore in the tendon 4A and a bore 170 in the member 123C. Eventually the cap 166 impinges on the dead end 171 of the chamber 159 and the pressure in the interior of the cap 166 is reduced to the hydrostatic pressure so that the member 123C moves forward relative to the cap 166 until the arms 165 become free from the cap skirt 166' and line up with apertures 172 in the cap, whereupon the arms 165 extend radially into the key way 167. The pressure at the piston 135A end is then reduced to below hydrostatic pressure so that the member 123C moves back until the extended arms 165 bear on a frusto-conical bearing plate 173 forming one surface of the key way 167. Operation is then proceeded with as already described.

To withdraw the tendon 4A it is necessary to retract the arms 165 from the key way 167. This is accomplished by driving the member 123C into the cap 166 by pressurizing the bottle 136 whilst the pressure in the interior of the cap 166 remains at hydrostatic pressure. If desired the pressure in the interior of the cap 166 can be reduced below hydrostatic pressure. As the member 123C moves relative to the cap 166 the skirt 166' of the cap 166 acts on the arms 165 to move to their retracted positions. The tendon is then withdrawn by reducing the pressure in the bottle 136, thus allowing sea water pressure to act on the exterior of the cap 166 to drive the unit 4A/123C/124A/135A in the direction back into the bottle 136. The cap 166 is provided with an annular notch 143A that corresponds to the notch 143 already described.

As a precaution, the facility is provided to reduce the pressure in the interior of the cap 166 to atmospheric to ensure that there is no possibility of the cap 166 releasing the arms 165 inadvertently during withdrawal.

It is to be noted that in the form of FIGS. 21 and 23 (and also in the case of FIGS. 20 and 22) there is no need to provide a sealing cap or sealed cavity in the member 1. Disconnection of the cap 166 is accomplished by removing the retaining lugs 168 from the skirt 166' after opening normally-closed hatches in the bottle 136 and at this stage the arms 165 are bolted in their retracted positions to enable them to pass out of the cap 166. Further retraction of the tendon to remove it fully from the cap 166 is achieved as previously described by repressurizing the bottle 136 and then reducing the pressure ahead of the piston 135A.

To sum up, during insertion the arms 165 are held retracted near their tips by the skirt 166' of the cap 166 so that their initial release occurs when the cap 166 impinges on the dead end 171. During retraction of the tendon the arms 165 are brought back into their retracted position and held there by the head of the cap 166. It is, however, possible to operate without relying on impingement of the cap 166 to establish anchorage. When operating in this way, at the commencement the cap is fully closed onto the member 123C to enshroud the arms 165, the cap being held in position by keeping its interior at low pressure. At the end of the desired movement the interior of the cap is pressurized above sea water pressure, forcing the member 123C in the direction out of the cap until the arms 165 are released through the apertures 172 to enter the key way 167.

It is to be noted that the lugs 168 and their associated slide way 169 are provided as a precautionary measure to prevent loss of the cap by, for example, incorrect operation of the hydraulic circuitry of the arrangement, or snagging of the cap during withdrawal.

We claim:

1. An articulated joint for a deep water installation in which two structural members are connected so as to afford limited pivotal movement between the members, the joint comprising replaceable flexible tendons connecting the structural members with a clearance between the members, each said tendon terminating at each end in a cylindrical member that is entered, at a mounting station associated with the relevant structural member, in a tubular portion of a tendon anchorage, there being access from the interior of each of the structural members to that end of each of said tendons that is connected to this structural member; each said tendon being releasably engaged at one end in its anchorage in one structural member, disposed in fluid-tight manner with respect to this structural member, the mounting station for each tendon is this structural member being adapted to have fitted at it a pressure bottle for containing the tendon whilst maintaining the fluid-tight sealing relationship of the tendon with the structural member, and each said tendon being held releasably fast with respect to said other structural member by a screw-threaded member mounted on said cylindrical member at the other end of the tendon; removal of the tendon from the joint being effected, with the pressure bottle fitted and the tendon released at its other end from the other structural member by removing said screw threaded member, by pressurizing the bottle, releasing said one end of the tendon, and depressurizing the bottle to permit the tendon to enter the bottle; there being a tendon extension at the other end of the tendon which is arranged to enter into fluid-tight sealing relationship with the last-mentioned structural member, when entry of the tendon into the pressure bottle is completed, thereby permitting removal of the tendon and the bottle from the tendon extension and fitting of a replacement tendon to the tendon extension.

2. A joint as claimed in claim 1, wherein each mounting station at which said other end of each tendon is releasably held fast with respect to said other structural member is adapted to have fitted to it after release of the tendon a sealing cap that serves to maintain said other structural member fluid-tight during replacement of the tendon.

3. A joint as claimed in claim 1, wherein the cylindrical member at said one end of each tendon, and the cylindrical member and the screw-threaded member at said other end of the tendon are normally enclosed by sealing domes that are removed to permit fitting of said tendon extension, a sealing cap to contain said tendon extension, and said pressure bottle.

4. A joint as claimed in claim 3, wherein said sealing cap can be pressurized to assist removal of the tendon.

5. An articulated joint for a deep water installation in which two structural members are connected so as to afford limited pivotal movement between the members, the joint comprising replaceable flexible tendons connecting the structural members with a clearance between the members, each said tendon terminating at each end in a cylindrical member that is entered, at a mounting station associated with the relevant structural member, in a tubular portion of a tendon anchorage there being access from the interior of one only of the structural members to that end of each of said tendons that is connected to this structural member and each said tendon being releasably held fast at this end by a screw-threaded member mounted on said cylindrical member at this end of the tension, disposed in fluid-tight manner with respect to this structural member, the mounting station for each tendon in this structural member being adapted to have fitted at it a pressure bottle for containing the tendon whilst maintaining the fluid-tight sealing relationship of the tendon with the structural member; and each tendon at its other end being made releasably fast with the other of the structural members by the engagement of an anchor head carried by the tendon with an anchor block fast with the other structural member, this engagement being effected or released by actuation of a drive connected thereto that passes along the tendon from said one only of the structural members; removal of the tendon from the joint being effected, with the pressure bottle fitted and the tendon released at its other end from the other structural member by actuating said drive member, by pressurizing the bottle, releasing said one end of the tendon, and depressurizing the bottle to permit the tendon to enter the bottle; there being a tendon extension at the other end of the tendon which is arranged to enter into fluid-tight sealing relationship with the last-mentioned structural member, when entry of the tendon into the pressure bottle is completed, thereby permitting removal of the tendon and the bottle from the tendon extension and fitting of a replacement tendon to the tendon extension.

6. A joint as claimed in claim 5, wherein the anchor head engages in screw-threaded manner with the anchor block; wherein said drive includes a flexible drive shaft passed through a bore in the tendon to engage the anchor head in rotationally fast manner; and wherein resiliently-loaded locking means are provided in the region of the anchor block and anchor head for locking the tendon against rotation during actuation of the drive.

7. A joint as claimed in claim 5, wherein the anchor head engages in screw-threaded manner with the anchor block; wherein said drive includes a bore in the tendon and a hydraulic motor actuable by hydraulic fluid passed along this bore and coupled for effecting or releasing the engagement of the anchor head and anchor block; and wherein resiliently-loaded locking means are provided in the region of the anchor block and anchor head for locking the tendon against rotation during actuation of the drive.

8. An articulated joint for a deep water installation in which two structural members are connected so as to afford limited pivotal movement between the members, the joint comprising replaceable flexible tendons connecting the structural members with a clearance between the members, each said tendon terminating at each end in a cylindrical member that is entered, at a mounting station associated with the relevant structural member, in a tubular portion of a tendon anchorage there being access from the interior of one only of the structural members to that end of each of said tendons that is connected to this structural member and each said tendon being releasably held fast at this end by a screw-threaded member mounted on said cylindrical member at this end of the tendon, disposed in fluid-tight manner with respect to this structural member, the mounting station for each tendon in this structural member being adapted to have fitted at it a pressure bottle for containing the tendon whilst maintaining the fluid-tight sealing relationship of the tendon with the structural member; and each tendon at its other end being made releasably fast with the other of the structural members by the engagement of an anchor head carried by the tendon with an anchor block fast with the other structural member; this engagement being effected or released by rotating the entire tendon; removal of the tendon from the joint being effected, with the pressure bottle fitted and the tendon released at its other end from the other structural member by rotating the entire tendon, by pressurizing the bottle, releasing said one end of the tendon, and depressurizing the bottle to permit the tendon to enter the bottle; there being a tendon extension at the other end of the tendon which is arranged to enter into fluid-tight sealing relationship with the last-mentioned structural member, when entry of the tendon into the pressure bottle is completed, thereby permitting removal of the tendon and the bottle from the tendon extension and fitting of a replacement tendon to the tendon extension.

9. An articulated joint for a deep water installation in which two structural members are connected so as to afford limited pivotal movement between the members, the joint comprising replaceable flexible tendons connecting the structural members with a clearance between the members, each said tendon terminating at each end in a cylindrical member that is entered, at a mounting station associated with the relevant structural member, in a tubular portion of a tendon anchorage there being access from the interior of one only of the structural members to that end of each of said tendons that is connected to this structural member and each said tendon being releasably held fast at this end by a screw-threaded member mounted on said cylindrical member at this end of the tendon, disposed in fluid-tight manner with respect to this structural member, the mounting station for each tendon in this structural member being adapted to have fitted at it a pressure bottle for containing the tendon whilst maintaining the fluid-tight sealing relationship of the tendon with the structural member; and each tendon at its other end being made releasably fast with the other of the structural members by the engagement of resiliently-loaded keys with a key way; this engagement being released by the actuation of ram means operated by supplying pressure flud through a bore in the tendon; removal of the tendon from the joint being effected, with the pressure bottle fitted and the tendon released at its other end from the other structural member by actuating said ram means by pressurizing the bottle, releasing said one end of the tendon, and depressurizing the bottle to permit the tendon to enter the bottle; there being a tendon extension at the other end of the tendon which is arranged to enter into fluid-tight sealing relationship with the last-mentioned structural member, when entry of the tendon into the pressure bottle is completed, thereby permitting removal of thetendon and the bottle from the tendon extension and fitting of a replacement tendon to the tendon extension.

10. An articulated joint for a deep water installation in which two structural members are connected so as to afford limited pivotal movement between the members, the joint comprising replaceable flexible tendons connecting the structural members with a clearance between the members, each said tendon terminating at each end in a cylindrical member that is entered, at a mounting station associated with the relevant structural member, in a tubular portion of a tendon anchorage there being access from the interior of one only of the structural members to that end of each of said tendons that is connected to this structural member and each said tendon being releasably held fast at this end by a screw-threaded member mounted on said cylindrical member at this end of the tendon, disposed in fluid-tight manner with respect to this structural member at a mounting station adapted to have fitted at it a pressure bottle for containing the tendon whilst maintaining the fluid-tight sealing relationship of the tendon with the structural member; the other end of the tendon being made releasably fast with the other of the structural members by the engagement of resiliently-loaded arms with a key way; there being a tendon extension at this other end formed as a cap that can engage the arms to overcome their resilient-loading and hold them clear of said key way; this cap being actuated by supplying pressure fluid through a bore in the tendon; removal of the tendon from the joint being effected, with the pressure bottle fitted and the tendon released at its other end from the other structural member by actuating said cab to engage said arms, by pressurizing the bottle, releasing said one end of the tendon, and depressurizing the bottle to permit the tendon to enter the bottle; said tendon extension at the other end of the tendon being arranged to enter into fluid-tight sealing relationship with the last-mentioned structural member, when entry of the tendon into the pressure bottle is completed, thereby permitting removal of the tendon and the bottle from the tendon extension and fitting of a replacement tendon to the tendon extension.

11. A joint as claimed in claim 10, wherein a locking means is provided for locking said tendon extension in the position in which it is in fluid-tight sealing relationship with said one of the structural members.

12. A joint as claimed in claim 10, wherein washers are disposed in abutting relationship along the tendon, the washers being of I section and viewed on a radial plane having convex inner and outer peripheral surfaces.

13. A joint as claimed in claim 12, wherein neighboring washers have inter-engaging male and female shear plates.

* * * * *